United States Patent
Daidoji et al.

(10) Patent No.: US 10,622,615 B2
(45) Date of Patent: Apr. 14, 2020

(54) ELECTROCHEMICAL DEVICE

(71) Applicant: NEC ENERGY DEVICES, LTD., Sagamihara-shi, Kanagawa (JP)

(72) Inventors: Takao Daidoji, Sagamihara (JP); Masaki Takeyama, Sagamihara (JP); Yoshitaro Watanabe, Sagamihara (JP)

(73) Assignee: Envision AESC Energy Devices Ltd., Sagamihara-shi (JP)

( * ) Notice: Subject to any disclaimer, the term of this patent is extended or adjusted under 35 U.S.C. 154(b) by 0 days.

(21) Appl. No.: 15/771,309

(22) PCT Filed: Nov. 2, 2016

(86) PCT No.: PCT/JP2016/082515
§ 371 (c)(1),
(2) Date: Apr. 26, 2018

(87) PCT Pub. No.: WO2017/090391
PCT Pub. Date: Jun. 1, 2017

(65) Prior Publication Data
US 2018/0315982 A1     Nov. 1, 2018

(30) Foreign Application Priority Data
Nov. 25, 2015     (JP) .................................. 2015-229834

(51) Int. Cl.
*H01M 2/00*     (2006.01)
*H01M 2/30*     (2006.01)
(Continued)

(52) U.S. Cl.
CPC .............. *H01M 2/30* (2013.01); *H01G 11/72* (2013.01); *H01G 11/76* (2013.01); *H01G 11/82* (2013.01);
(Continued)

(58) Field of Classification Search
CPC ...... H01M 2/26; H01M 2/266; H01M 2/0275; H01M 2/30; H01M 4/02; H01M 4/623; H01G 11/72; H01G 11/64
See application file for complete search history.

(56) References Cited

U.S. PATENT DOCUMENTS

| 6,524,741 B1 * | 2/2003 | Bryan ................. H01M 2/0207 429/162 |
| 2012/0177981 A1 * | 7/2012 | Kim ...................... H01M 2/266 429/163 |

FOREIGN PATENT DOCUMENTS

| JP | 2001-236947 A | 8/2001 |
| JP | 2002-75327 A | 3/2002 |

(Continued)

OTHER PUBLICATIONS

International Search Report for PCT/JP2016/082515 dated Dec. 13, 2016 [PCT/ISA/210].

*Primary Examiner* — Cynthia H Kelly
*Assistant Examiner* — Monique M Wills
(74) *Attorney, Agent, or Firm* — Sughrue Mion, PLLC

(57) ABSTRACT

An electrochemical device includes a storage element in which two types of electrodes are superposed on each other with a separator interposed therebetween and an outer container made of a flexible film that houses the storage element and an electrolyte solution, the two types of electrodes each including an active material-applied portion where an active material layer is formed on current collector 9, and an active material-non-applied portion, wherein each of the two types of electrodes is provided with an electrode terminal 7 and support tab 13, one end portion of electrode terminal 7 being superposed on the active material-non-applied portion of the electrode in the outer container, the other end portion of electrode terminal 7 extending to an outside of the outer container, support tab 13 sandwiching (Continued)

the active material-non-applied portion along with the one end portion of electrode terminal 7 in the outer container, and the active material-non-applied portion, electrode terminal 7, and support tab 13 are joined at a position where they are superposed on one another. Support tab 13 has a planar shape without any corner portion of 90 degrees or less.

19 Claims, 7 Drawing Sheets

(51) Int. Cl.
| | | |
|---|---|---|
| *H01G 11/76* | (2013.01) |
| *H01M 2/26* | (2006.01) |
| *H01G 11/72* | (2013.01) |
| *H01G 11/82* | (2013.01) |
| *H01M 2/02* | (2006.01) |
| *H01M 4/02* | (2006.01) |

(52) U.S. Cl.
CPC ........... *H01M 2/0275* (2013.01); *H01M 2/26* (2013.01); *H01M 2/266* (2013.01); *H01M 4/02* (2013.01)

(56) References Cited

FOREIGN PATENT DOCUMENTS

| | | |
|---|---|---|
| JP | 2002-141051 A | 5/2002 |
| JP | 2002-252145 A | 9/2002 |
| JP | 2003-257409 A | 9/2003 |
| JP | 2007-250310 A | 9/2007 |
| JP | 2008-27893 A | 2/2008 |
| JP | 2008-34356 A | 2/2008 |
| JP | 2010-80393 A | 4/2010 |
| JP | 5550805 B2 | 7/2014 |
| JP | 2014-191967 A | 10/2014 |

\* cited by examiner

ELECTROCHEMICAL DEVICE

CROSS REFERENCE TO RELATED APPLICATIONS

This application is a National Stage of International Application No. PCT/JP2016/082515, filed on Nov. 2, 2016, which claims priority from Japanese Patent Application No. 2015-229834 filed on Nov. 25, 2015.

TECHNICAL FIELD

The present invention relates to an electrochemical device.

BACKGROUND ART

Secondary batteries that are an example of electrochemical devices are in great demand in various fields such as power sources for portable electric equipment such as cell phones and smartphones, digital cameras, and notebook personal computers, and power sources (electric power storage equipment) for vehicles and households. Among the secondary batteries, lithium ion secondary batteries being an example of non-aqueous electrolyte secondary batteries that can be repeatedly charged/discharged have a high energy density, a light weight and excellent charging/discharging cycle characteristics, and are energy accumulation devices indispensable to daily life.

In such a non-aqueous electrolyte secondary battery, an electrode laminate configured by alternately laminating two types of electrodes (positive electrode and negative electrode) with a separator interposed therebetween is housed in an outer container, the electrode of the electrode laminate is connected to an electrode terminal (electrode lead), and the electrode terminal extends to the outside of the outer container.

The secondary battery is required to have different characteristics depending on devices using the secondary battery and use environments thereof, but improving the energy density per unit volume is necessary for use in various applications. Thus, flexible container made of a flexible film whose shape is highly flexible instead of a metal can whose shape is highly limited has been selected for the outer container of the non-aqueous electrolyte secondary battery. The flexible film is typically a laminate film in which resin layers are laminated on both surfaces of a metal foil. The outer container made of the flexible film can be closely in contact with an outer surface of the electrode laminate almost without gap, thereby making it possible to improve the energy density per unit volume and to achieve higher volume efficiency by having a thinner design. A secondary battery (film-packaged battery) having such an outer container made of the flexible film is disclosed in Patent Documents 1 to 2.

In a configuration disclosed in Patent Document 2, a support tab (protection lead) is disposed on an electrode tab that is a part of an electrode superposed on an electrode terminal (electrode lead). The electrode tab, the support tab, and the electrode terminal are joined together with the electrode tab sandwiched between the support tab and the electrode terminal. Providing the support tab enables reliability of the connection between the electrode tab and the electrode terminal to be improved, and enables preventing the electrode tab and electrode terminal from being damaged when they are joined.

PRIOR ART DOCUMENTS

Patent Documents

Patent Document 1: JP2008-27893A
Patent Document 2: JP2010-80393A

SUMMARY OF INVENTION

Problem to be Solved by the Invention

The outer container made of the flexible film has inferior strength as compared with the outer container made of the metal can. That is, the flexible film is easily damaged. If the flexible film is damaged, an electrical short-circuit in the electrochemical device or a leakage of electrolyte solution may occur.

Since the support tab that is used in Patent Document 2 is thinner than the electrode terminal, the support tab is easily warped when members such as a welding horn and an anvil are pressed to the support tab. The warped support tab may damage the flexible film included in the outer container from the inside.

The present invention is made with a view to solve the above problems, and an object of the present invention is to provide an electrochemical device that has a high energy density and high volume efficiency, and reduces the risk of damage to flexible film included in an outer container.

Means to Solve the Problem

The present invention is characterized in that an electrochemical device comprises a storage element in which two types of electrodes are superposed on each other with a separator interposed therebetween, and an outer container is made of a flexible film that houses the storage element and an electrolyte solution, the two types of electrodes each including an active material-applied portion where an active material layer is formed on a current collector, and an active material-non-applied portion where no active material layer is formed on the current collector, wherein each of the two types of electrodes is provided with an electrode terminal and a support tab, one end portion of the electrode terminal being superposed on the active material-non-applied portion of the electrode in the outer container, the other end portion of the electrode terminal extending to an outside of the outer container, the support tab and the one end portion of the electrode terminal sandwiching the active material-non-applied portion in the outer container, and the active material-non-applied portion, the electrode terminal, and the support tab being joined at a position where they are superposed on one another, and the support tab has a planar shape without corner portions that are 90 degrees or less.

Advantageous Effect of Invention

According to the present invention, an electrochemical device can be provided with high reliability that has a high energy density and high volume efficiency by using an outer container made of flexible film, and that reduces the risk that the support tabs may damage a flexible film included in an outer container.

BRIEF DESCRIPTION OF DRAWINGS

FIG. 1b is a cross-sectional view taken along line A-A of FIG. 1a.

DESCRIPTION OF EXEMPLARY EMBODIMENT

An exemplary embodiment will be described using the drawings.

[Configuration of Secondary Battery]

Figure 1A:
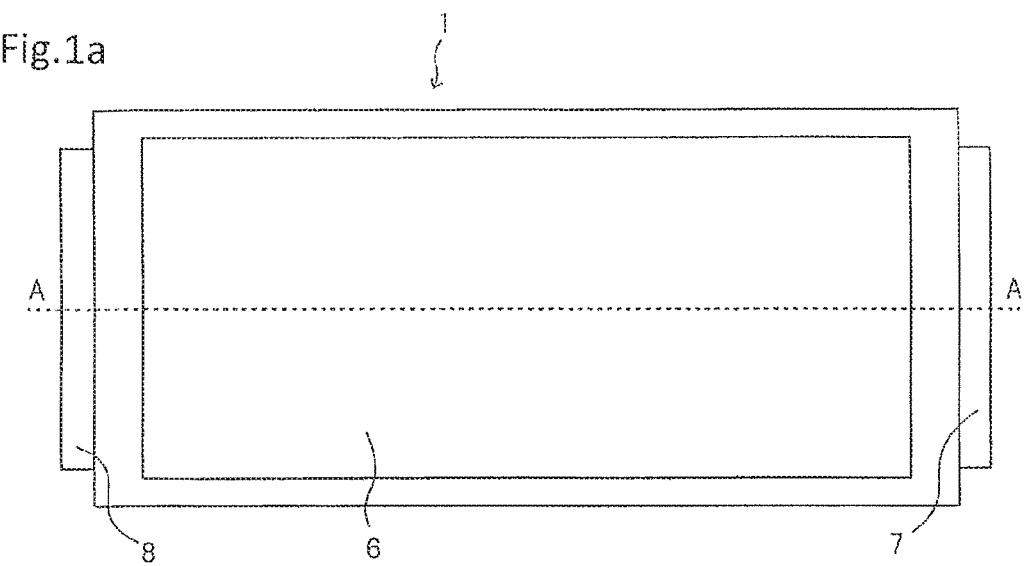
FIG. 1a is a plan view illustrating a basic structure of a secondary battery of one exemplary embodiment of an electrochemical device of the present invention.
Figure 1B:
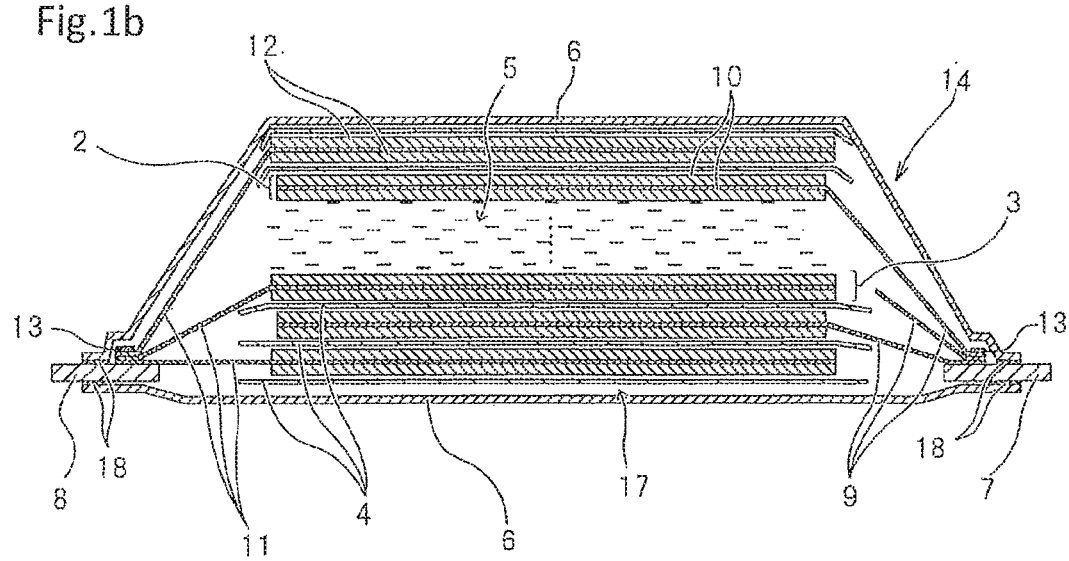
Figure 2:
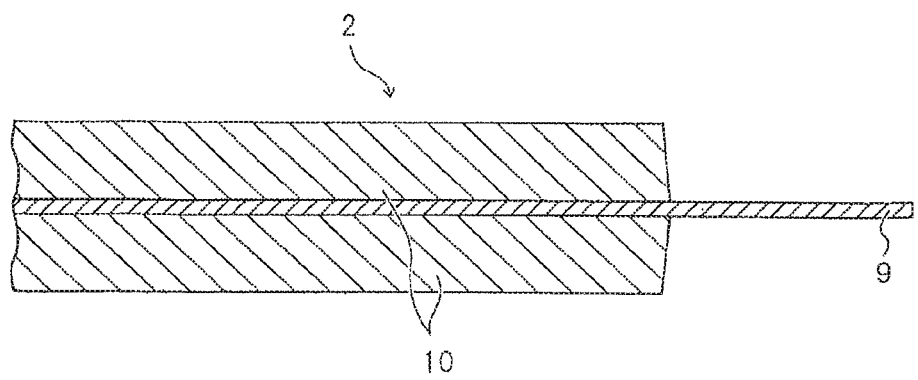
FIG. 2 is an enlarged cross-sectional view illustrating a main portion of a positive electrode of the secondary battery illustrated in FIGS. 1a-1b.
Figure 3:
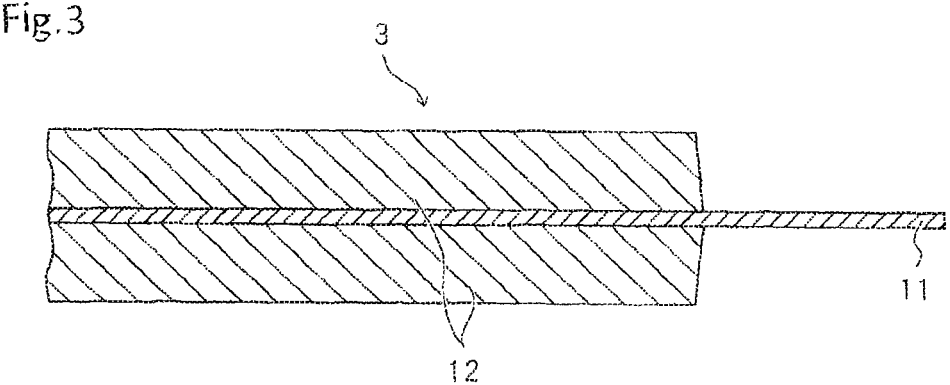
FIG. 3 is an enlarged cross-sectional view illustrating a main portion of a negative electrode of the secondary battery illustrated in FIGS. 1a-1b.

FIGS. 1a and 1b are schematic diagrams each illustrating a film-packaged secondary battery of one exemplary embodiment of an electrochemical device of the present invention. FIG. 1a is a plan view viewed vertically from above with respect to a main surface (flat face) of the secondary battery, and FIG. 1b is a cross-sectional view taken along line A-A of FIG. 1a. FIG. 2 is an enlarged cross-sectional view of a main portion of a positive electrode, and FIG. 3 is an enlarged cross-sectional view of a main portion of a negative electrode.

Film-packaged secondary battery 1 of the present invention includes electrode laminate (storage element) 17 in which two types of electrodes, i.e., positive electrodes (positive electrode sheets) 2 and negative electrodes (negative electrode sheets) 3 are laminated on each other with separator 4 interposed therebetween. Storage element 17 is housed together with electrolyte solution 5 in outer container 14 made of flexible film (laminate film) 6. One end portion of positive electrode terminal 7 is connected to positive electrodes 2 of storage element 17, and one end portion of negative electrode terminal 8 is connected to negative electrodes 3 of storage element 17. The other end portion of positive electrode terminal 7 and the other end portion of negative electrode terminal 8 are led out to the outside of outer container 14 made of flexible film 6. A part of layers (layers in an intermediate portion in a thickness direction) of storage element 17 is not illustrated in FIG. 1b, and electrolyte solution 5 is illustrated in the middle portion of storage element 17. In FIG. 1b, positive electrode 2, negative electrode 3, separator 4, and flexible film 6 are illustrated so as not to be in contact with each other in an easy-to-see manner, but these are actually closely laminated.

As illustrated in FIG. 2, positive electrode 2 includes current collector for a positive electrode (positive electrode current collector) 9 and active material layer for a positive electrode (positive electrode active material layer) 10 that is formed on positive electrode current collector 9. A front surface and a rear surface of positive electrode current collector 9 each include an active material-applied portion where positive electrode active material layer 10 is formed, and an active material-non-applied portion where positive electrode active material layer 10 is not formed. As illustrated in FIG. 3, negative electrode 3 includes current collector for a negative electrode (negative electrode current collector) 11, and active material layer for a negative electrode (negative electrode active material layer) 12 that is formed on negative electrode current collector 11. A front surface and a rear surface of negative electrode current collector 11 each include an active material-applied portion and an active material-non-applied portion.

Each of the active material-non-applied portions (current collectors 9, 11) of positive electrode 2 and negative electrode 3 is used as an electrode tab (positive electrode tab, negative electrode tab) for connecting the electrode terminal (positive electrode terminal 7, negative electrode terminal 8). As illustrated FIG. 1b, current collectors of active material-non-applied portions of the same type of electrodes are superposed on one another to form an assembly. That is, the positive electrode tabs (positive electrode current collector 9 of active material-non-applied portions) of positive electrodes 2 are collectively laminated on one end portion of positive electrode terminal 7 to form an assembly, the assembly is sandwiched between metal piece (support tab) 13 and positive electrode terminal 7 so that they are connected to one another by ultrasonic welding or the like at a position where they are superposed on one another. Similarly, the negative electrode tabs (negative electrode current collector 11 of active material-non-applied portions) of negative electrodes 3 are collectively laminated on one end portion of negative electrode terminal 8 to form an assembly, and the assembly is sandwiched between metal piece (support tab) 13 and negative electrode terminal 8 so that they are connected to one another by ultrasonic welding, or the like at a position where they are superposed on one another. The other end portion of positive electrode terminal 7 and the other end portion of negative electrode terminal 8 extend to the outside of the outer container 14 made of flexible film 6.

Figure 4:
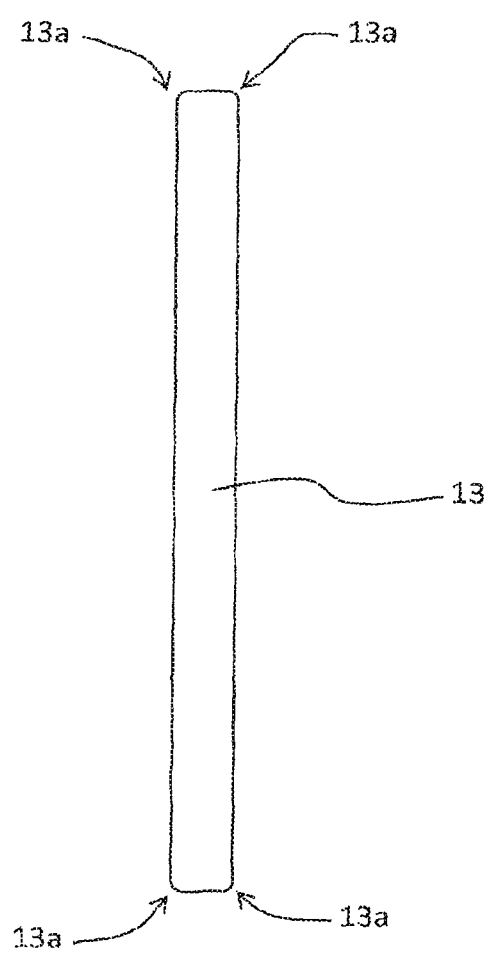
FIG. 4 is an enlarged plan view illustrating a support tab of the secondary battery illustrated in FIGS. 1a-1b.

Support tab 13 illustrated in FIG. 4 preferably prevents the electrode tabs (electric collectors 9, 11) from being damaged and improves the reliability of the connection between the electrode tabs and the electrode terminal (positive electrode terminal 7, negative electrode terminal 8). Support tab 13 has a thin thickness and a high strength, and is resistant to electrolyte solution 5. Support tab 13 has a thickness of 60 μm to 150 μm, and a planar shape in which there are not any corners that are 90 degrees or less, preferably a planar shape without any portion (crossing angle portion) in which two linear sides cross at one point, for example. In the exemplary embodiment, four corner portions 13a of a quadrangle each having a rounded shape (square shape with round corners) are applied to support tab 13. In an example, a curvature radius of a rounded portion is 1.0 to 2.0 mm. Thus, using support tab 13 having a planar shape without any crossing angle portions enables preventing damage to flexible film 6 included in outer container 14. This point will be described in detail later. Examples of preferable material forming support tab 13 include aluminum, nickel, copper, stainless (SUS), and the like.

An external dimension of the active material-applied portion of negative electrode 3 (negative electrode active material layer 12) is larger than that of the active material-applied portion of positive electrode 2 (positive electrode active material layer 10), and is smaller than or equal to that of separator 4.

In the secondary battery of the exemplary embodiment, examples of active material contained in positive electrode active material layer 10 include layered oxide-based materials such as $LiCoO_2$, $LiNiO_2$, $LiMn_2O_2$, $Li_2MO_3$—$LiMO_2$, and $LiNi_{1/3}Co_{1/3}Mn_{1/3}O_2$, spinel-based materials such as $LiMn_2O_4$, olivine-based materials such as $LiMPO_4$, fluorinated olivine-based materials such as $Li_2MPO_4F$, and $Li_2MSiO_4F$, and vanadium oxide-based materials such as $V_2O_5$, and so on. A part of elements making up the active materials contained in each positive electrode active material may be replaced with other elements. The positive electrode active material may contain excess Li. The positive electrode active materials may be used singly or as a combination of two or more of active materials.

Examples of active material contained in negative electrode active material layer 12 include carbon materials such as graphite, amorphous carbon, diamond-like carbon, fullerene, carbon nanotubes, and carbon nanohorns, lithium metal materials, alloy-based materials such as silicone and tin, oxide-based materials such as $Nb_2O_5$, and $TiO_2$, and their composite materials.

Active material mixtures contained in positive electrode active material layer 10 and negative electrode active material layer 12 each are obtained by appropriately adding a binder, a conductive agent and the like to the active material described above. Examples of the conductive agent include carbon black, carbon fiber, graphite and the like. These conductive agents may be used singly or as a combination of two or more of conductive agents. Examples of the binder that can be used include polyvinylidene fluoride, polytetrafluoroethylene, carboxymethylcellulose, modified acrylonitrile rubber particles and the like.

Examples of a material that can be used for positive electrode current collector 9 include aluminum, stainless steel, nickel, titanium, and alloys thereof. Particularly, as positive electrode current collector 9, aluminum is preferably used. Examples of a material that can be used for negative electrode current collector 11 include copper, stainless steel, nickel, titanium, and alloys thereof.

Examples of organic solvent that can be used for electrolyte solution 5 include cyclic carbonates such as ethylene carbonate, propylene carbonate, vinylene carbonate, and butylene carbonate, chain carbonates such as ethyl methyl carbonate (EMC), diethyl carbonate (DEC), dimethyl carbonate (DMC), and dipropyl carbonate (DPC), aliphatic carboxylate esters, γ-lactones such as γ-butyrolactone, chain ethers, and cyclic ethers. The organic solvents may be used singly or as a combination of two or more thereof. Furthermore, a lithium salt can be dissolved in these organic solvents.

Separator 4 mainly includes resin porous membranes, woven fabrics, and nonwoven fabrics. Examples of the resin component that can be used includes polyolefin resins such as polypropylene, and polyethylene, polyester resins, acryl resins, styrene resins, nylon resins, aramid resins (aromatic polyamide resins), polyimide resins and the like. Particularly, as separator 4, a fine porous membrane of a polyolefin is preferably used because it has excellent ion permeability characteristics and excellent characteristics for physically separating the positive electrode and the negative electrode. Furthermore, as required, separator 4 may include a layer containing inorganic substance particles. Examples of the inorganic substance particles include particles of insulative oxides, nitrides, sulfides, carbides and the like. Particularly, the inorganic substance particles containing $TiO_2$ or $Al_2O_3$ are preferable.

The outer container 14 is a light outer case made of flexible film 6. An example of the flexible film 6 is a laminate film including a metal foil as a base material, and resin layers that are formed on both surfaces of the metal foil. As a material of the metal layer, there can be selected a material having the barrier property capable of preventing the leakage of electrolyte solution 5 to the outside and the intrusion of moisture from the outside. Examples of the material that can be used include aluminum, stainless steel and the like. At least one surface of the metal foil is provided with a heat fusing resin layer containing a modified polyolefin and the like. The outer container 14 is formed by making the heat fusing resin layers of flexible films 6 face each other and heat fusing the circumference of the portion where storage element 17 is housed. As a surface of the outer container, a surface of the metal foil that is a surface opposite to a surface where the heat fusing resin layer is formed can be provided with a resin layer of nylon film, polyethylene terephthalate film, polyester film, or the like.

Examples of materials that can be used for positive electrode terminal 7 include materials made of aluminum or aluminum alloys. Examples of materials that can be used for negative electrode terminal 8 include materials made of copper, copper alloys, nickel-plated copper, nickel-plated copper alloys, nickel and the like. The other ends of terminals 7, 8 each are led out to the outside of the outer container 14. A heat fusing resin (sealing material) may be previously provided on a portion of each of terminals 7, 8 which corresponds to a heat welding portion on an outer peripheral portion of the outer container 14.

Positive electrode active material layer 10 and negative electrode active material layer 12 may generate, for example, an unavoidable inclination, unevenness, roundness or the like of each layer caused by the variations in manufacturing and the layer forming capability.

[Method of Manufacturing Secondary Battery]

To manufacture a secondary battery, firstly electrodes 2, 3 for the secondary battery are manufactured. Specifically, positive electrode active material layers 10 are formed on both surfaces of positive electrode current collector 9, respectively, as illustrated in FIG. 2. An end portion of the active material-applied portion (positive electrode active material layer 10) at a boundary region with the active material-non-applied portion may be substantially vertically cut with respect to positive electrode current collector 9, and may be formed in an inclined shape or a stepped shape so that a thickness thereof is reduced as compared with that of a center portion of positive electrode active material layer 10. As illustrated in FIG. 3, negative electrode active material layers 12 are formed on both surfaces of negative electrode current collector 11, respectively. An end portion of negative electrode active material layer 12 (end of active material-applied portion) may be substantially vertically cut with respect to negative electrode current collector 11, and may be formed in an inclined shape or a stepped shape so that a thickness thereof is reduced as compared with that of a center portion of negative electrode active material layer 12. Positive electrode 2 and negative electrode 3 thus formed are alternately and repeatedly laminated with separator 4 interposed therebetween, and are connected to positive electrode terminal 7 and negative electrode terminal 8, respectively.

Figure 5:
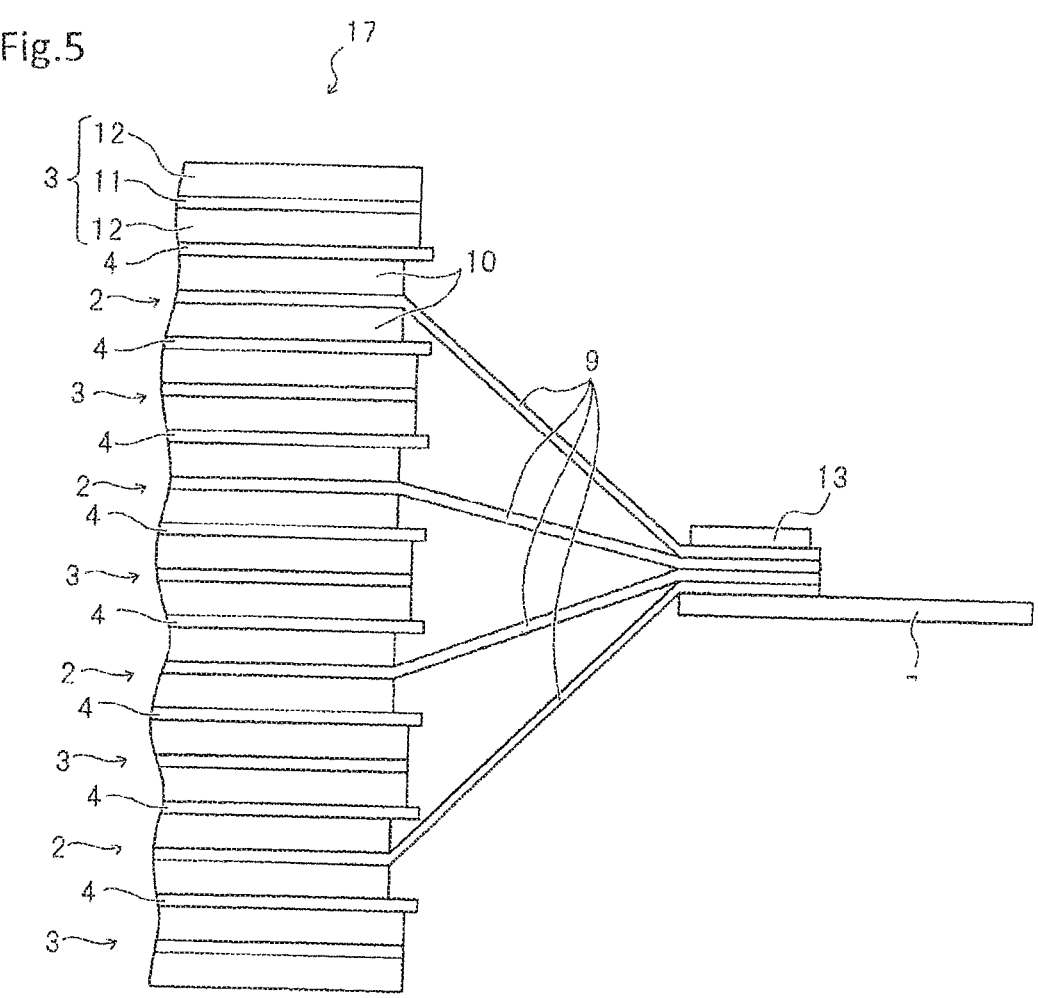
FIG. 5 is a lateral view illustrating a step of connecting electrode tabs and an electrode terminal of the secondary battery illustrated in FIGS. 1a-1b.
Figure 6:
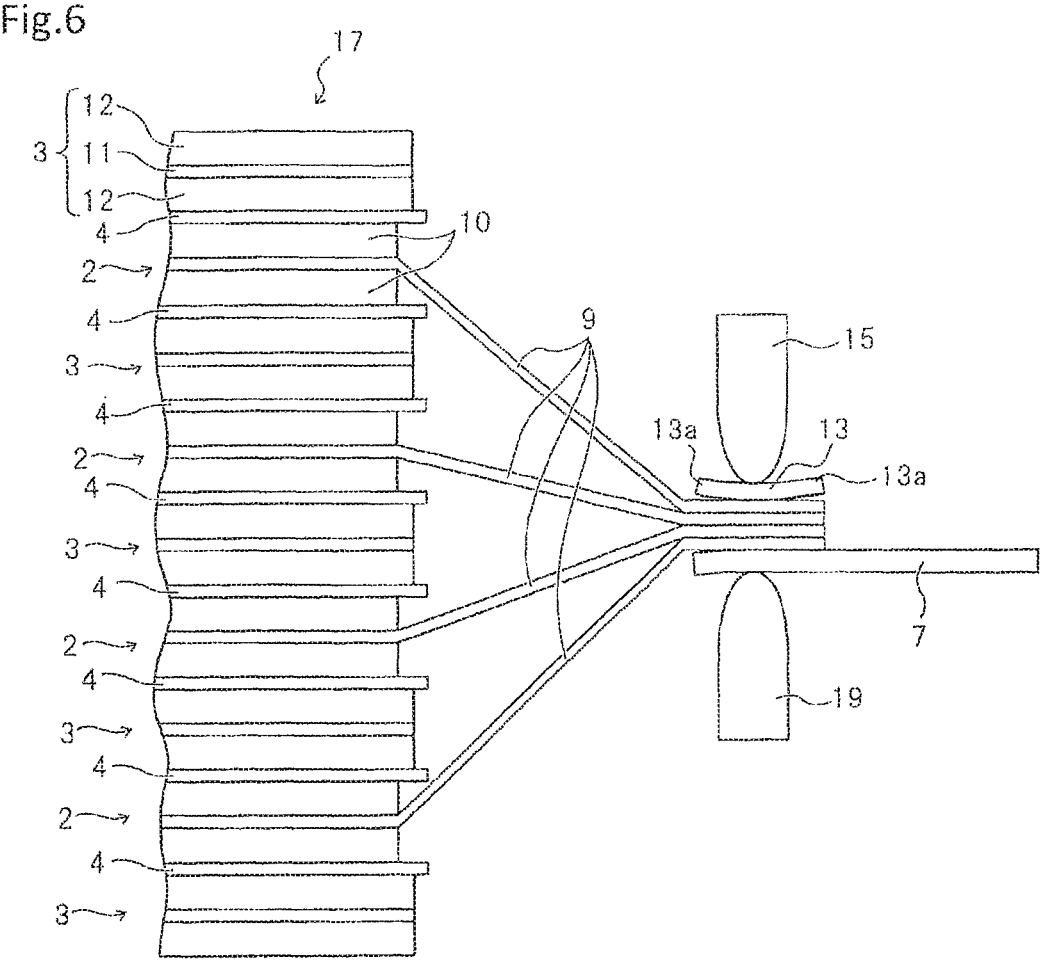
FIG. 6 is a lateral view illustrating a step following the step of FIG. 5.

A step of connecting to positive electrode terminal 7 and negative electrode terminal 8 will be described in details. As illustrated in FIG. 5, the positive electrode tabs (positive electrode current collectors 9) of positive electrodes 2 are closely superposed on one end portion of positive electrode terminal 7, and metal piece (support tab) 13 is further disposed to be superposed on the positive electrode tabs. Then, they are collectively joined. There are a plurality of methods of joining the electrode tab and the electrode terminal, and joining by ultrasonic welding is often used. As illustrated in FIG. 6, positive electrode terminal 7 and support tab 13 sandwiching a plurality of positive tabs are respectively pushed and pressed by welding horn 15 and anvil 19 to be pressurized while vibrating, and are joined together by ultrasonic welding.

Since the thickness of positive electrode current collector 9 used as the positive electrode tab is small such as several μm to 20 μm, positive electrode current collector 9 is stuck to welding horn 15 or anvil 19, if the ultrasonic welding is performed in a state where positive electrode current collector 9 is directly in contact with or close to welding horn 15 or anvil 19, with the result that positive electrode current collector 9 may break when being separated from welding horn 15 or anvil 19. Positive electrode current collector 9 on one of the outermost layers of storage element 17 is contact with anvil 19 through relatively thick positive electrode terminal 7, and therefore positive electrode current collector 9 is not stuck to the anvil 19. However, if positive electrode current collector 9 on the other of the outermost layers is directly in contact with welding horn 15, positive electrode current collector 9 is stuck to welding horn 15, which may cause breakage. To prevent the breakage, in the present invention, support tab 13 (thickness of about 60 μm to 150 μm) that is thicker than positive electrode current collector 9 (thickness of about several μm to 20 μm) is disposed between positive electrode current collector 9 and welding horn 15. Thus, the planar shape of support tab 13 must be larger than the planar shape of a contact portion of welding horn 15 so that welding horn 15 is prevented from protruding to the outside of support tab 13 so that it is not in direct contact with positive electrode current collector 9 even when a slight positional deviation is caused between welding horn 15 and support tab 13. As a result, there exists a non-welded portion in which ultrasonic welding is not applied, around joining portion 16 (three places in the example illustrated in FIG. 7) by ultrasonic welding of support tab 13.

As described above, when positive electrode terminal 7 and support tab 13 sandwiching the plurality of positive tabs are respectively pushed and pressed by welding horn 15 and anvil 19 to be pressurized while vibrating, and are joined together by ultrasonic welding, the non-welded portions around joining portions 16 of support tab 13 are warped which causes lifting, as illustrated in FIG. 6. Support tab 13 has a thickness thicker than positive electrode current collector 9, but does not have sufficient strength to prevent it from being warped when it is pressed by welding horn 15. The warped and lifted portions of support tab 13 are in contact with flexible film 6 included in outer container 14 from the inside when storage element 17 is housed in outer container 14.

If support tab 13 has a planar shape having a crossing angle portion in which two linear sides cross at one point, support tab 13 is lifted and the crossing angle portion is in contact with flexible film 6, which may cause damage to flexible film 6. If support tab 13 has particularly a sharp corner portion of 90 degrees or less, the sharp corner portion is in contact with flexible film 6 which causes damage to flexible film 6 with a high possibility. If resin layers of multilayer flexible film 6 are damaged and the internal metal foil is exposed, an electrical short-circuit may occur between positive electrode 2 and negative electrode 3 of storage elements 17. If flexible film 6 is largely damaged, electrolyte solution 5 in outer container 14 may leak to the outside. However, since support tab 13 of the present invention has the planar shape having rounded corner portions 13a without any crossing angle portion (portion in which two linear sides cross at one point), the risk of damage to flexible film 6 is reduced even when rounded corner portion 13a is partially deformed and lifted and in contact with flexible film 6. Therefore, it is possible to prevent the occurrence of the above described electrical short circuit and formation of an alloy due to the electrical short circuit, and to reduce the possibility of problems such as performance deterioration of the battery, the leakage of electrolyte solution 5 from the inside of outer container 14, and so on.

Figure 7:
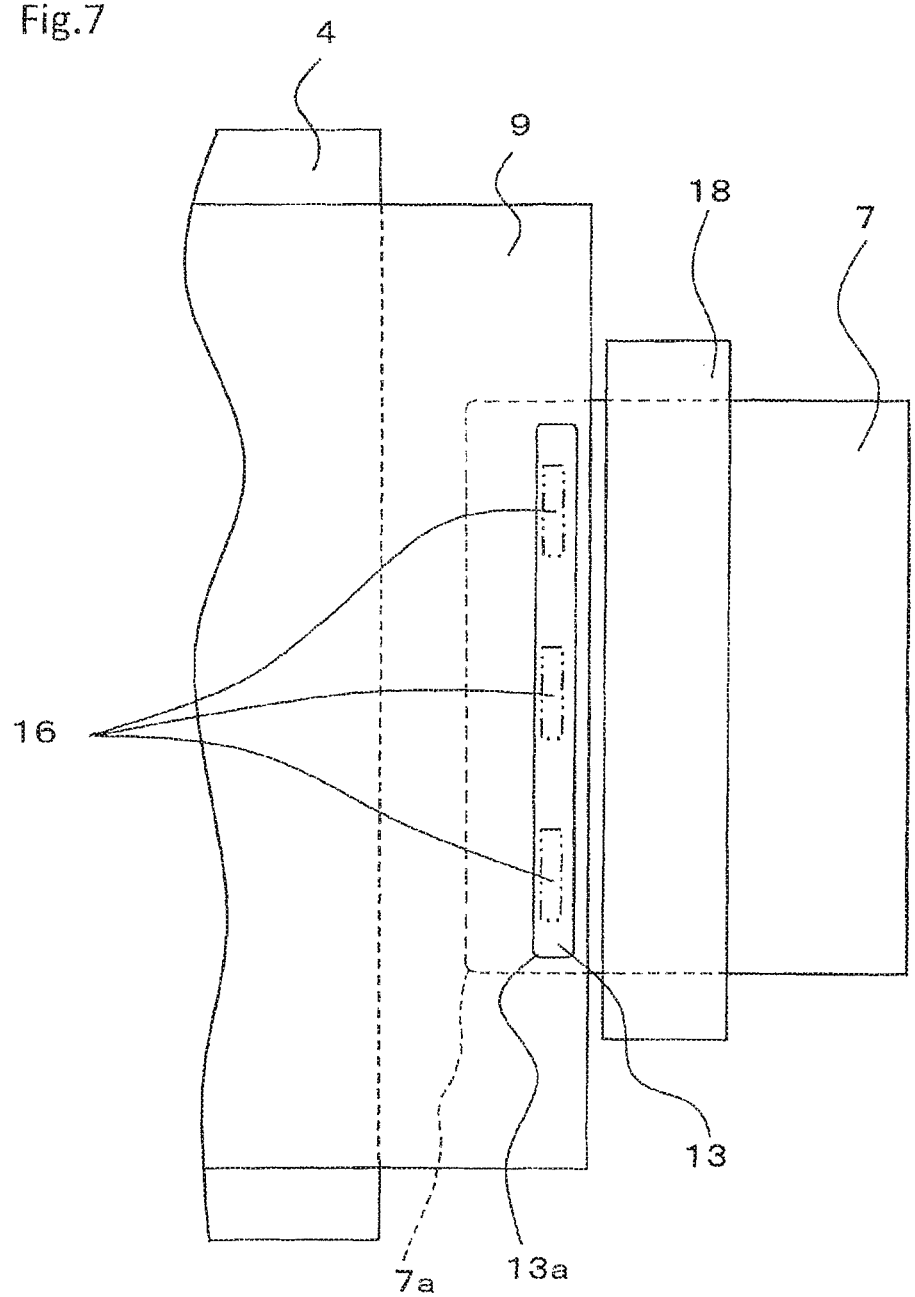
FIG. 7 is a plan view illustrating a step following the step of FIG. 6.

Positive electrode terminal 7 which is in contact with anvil 19 has a thicker thickness and a higher strength than support tab 13, the deformation such as warpage is small, thereby reducing a risk of damage to flexible film 6. However, as illustrated in FIG. 7, it is preferable that flexible film 6 be surely prevented from damage when positive electrode terminal 7 is formed to have a planar shape having rounded corner portion 7a without any crossing angle portion at an end portion close to storage element 17. Furthermore, a protective insulating tape (not illustrated) may be attached on support tab 13.

Note that in the above explanation, anvil 19 is in contact with positive electrode terminal 7, welding horn 15 is disposed an opposite side thereof, and the ultrasonic welding is performed. However, welding horn 15 and anvil 19 may be exchanged. In this case, welding horn 15 is replaced with anvil 19, and anvil 19 is replaced with welding horn 15 in the above-described explanation.

Similarly to positive electrode 2 illustrated in FIGS. 5 to 7, in negative electrode 3, an assembly in which a plurality of active material-non-applied portions (negative electrode current collectors) 11 are superposed on one another is sandwiched between support tab 13 and negative electrode terminal 8, and are joined together by ultrasonic welding, although not illustrated. Since support tab 13, as described above, has the planar shape without any crossing angle portion (portion in which two linear sides cross at one point), the risk of damage to flexible film 6 is reduced, thereby reducing the possibility of causing problems such as the electrical short-circuit and the leakage of electrolyte solution 5. It is sure that damage to flexible film 6 can be prevented because negative electrode terminal 8 is formed to have a planar shape without any crossing angle portion at an end portion close to storage element 17 (which has rounded shape of corner portion at end portion close to storage element 17). Furthermore, a protective insulating tape (not illustrated) may be attached on support tab 13.

Storage element 17 thus completed by connecting positive electrode terminal 7 to the active material-non-applied portions (positive electrode current collectors 9) of positive electrodes 2, and by connecting negative electrode terminal 8 to the active material-non-applied portions (negative electrode current collectors 11) of negative electrodes 3 are housed together with electrolyte solution 5 in the outer container made of flexible film 6. Positive electrode terminal 7 and negative electrode terminal 8 that extend to the outside of the outer container 14 are fixed to the outer peripheral portions of flexible films 6 through sealing materials (sealant) 18 (not illustrated in FIGS. 5, 6) that are previously provided to electrode terminals 7, 8, respectively. As well, in the outer peripheral portions of the outer container 14 where electrode terminals 7, 8 are not present, the outer peripheral portions of flexible films 6 are heat-welded to seal the outer container 14 in which storage element 17 is housed, thereby completing secondary battery 1 illustrated in FIGS. 1*a*, 1*b*.

According to the present invention as described above, even if lifting and deformation are generated in a part of support tab 13 when support tab 13, active material-non-applied portions (current collector 9, 11), and electrode terminal 7, 8 are joined together, four corner portions 13*a* of support tab 13 have rounded shape, each corner portion 13*a* is not a crossing angle portion where two linear sides cross at one point, and thereby can prevent damage to flexible film 6 caused by deformation of support tab 13. As a result, the electrical short-circuit between the metal foil in the inner layer of flexible film 6 and electrode 2, 3, and the formation of alloy due to an electrical short-circuit can be prevented, and the risk that the performance of the battery will deteriorate and that fluid (electrolyte solution 5) will leak from the inside of outer container 14 can be reduced.

To prevent damage to flexible film 6, consideration can also be given to making support tab 13 round from an end portion toward a center portion in a thickness direction as in the protective lead (support tab) illustrated in FIG. 1 of Patent Document 2, for example. However, if the support tab is thin (e.g., a thickness of about 60 μm to 150 μm), it is difficult or almost impossible to make the support tab round from the end portion toward the center portion in the thickness direction. Even if such thin support tab is rounded from the end portion toward the center portion in the thickness direction, the shape of the support tab is hardly different from that when the support tab is not rounded, and a large effect cannot be expected. If the thickness of the support tab is increased so that the support tab can be easily rounded from the end portion toward the center portion in the thickness direction and the effect can be exhibited, joining the support tab, the electrode tabs and the electrode terminal through the use of ultrasonic welding is obstructed. On the other hand, since support tab 13 of the present invention is thin (thickness of about 60 μm to 150 μm) so that the support tab 13 is firmly joined with the electrode tabs and the electrode terminal by the ultrasonic welding, it is difficult to round the support tab from the end portion toward the center portion in the thickness direction, but very easy to round the support tab in the planar shape. In the present invention, a process of forming support tab 13 in a planar shape without any corner portions of 90 degrees or less is significantly easier than a process of rounding support tab 13 from the end portion toward the center portion in the thickness direction, and a larger effect can be exhibited. In other words, since support tab 13 of the present invention has a planar shape without any crossing angle portion of 90 degrees or less, the damage to flexible film 6 can be prevented even without rounding support tab 13 from the end portion toward the center portion in the thickness direction. This thereby enables obtaining excellent workability.

Figure 8A:
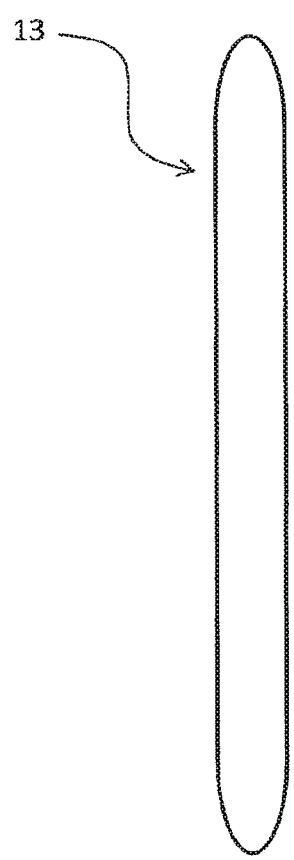
FIG. 8a is an enlarged plan view illustrating a modification of the support tab of the secondary battery illustrated in FIGS. 1a-1b.
Figure 8B:
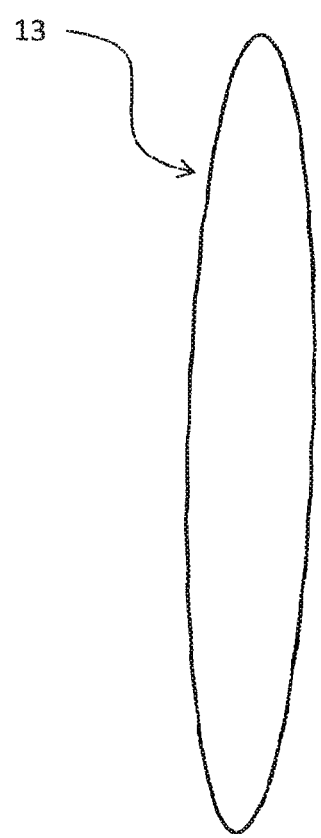
FIG. 8b is an enlarged plan view illustrating another modification of the support tab of the secondary battery illustrated in FIGS. 1a-1b.

Support tab 13 of the present invention may have a planar shape without any crossing angle portion of 90 degrees or less (portion in which two linear sides cross at one point), i.e., a planar shape without any sharp portion (acuminated portion) to reduce the risk of causing damage to flexible film 6. As a modification of support tab 13, the planar shape of support tab 13 is not limited to a substantially quadrangle as illustrated in FIGS. 4 and 7, and may be a shape in which end portions of two parallel straight lines are connected with each other through circular arc, respectively, as illustrated in FIG. 8*a*, and may be an elliptical planar shape as illustrated in FIG. 8*b*.

In the above-described exemplary embodiment, an electrode laminated body in which positive electrodes 2 and negative electrodes 3 are alternately and repeatedly laminated on each other with separators 4 interposed therebetween is used as storage element 17. However, storage element 17 in which only one positive electrode 2 and only one negative electrode 3 are superposed on each other with separator 4 interposed therebetween can be used. A wound body in which one long positive electrode 2 and one long negative electrode 3 superposed on each other with separator 4 interposed therebetween are wound can be used as storage element 17. The present invention is particularly useful for a lithium ion secondary battery, and also can be effectively applied to a secondary battery other than a lithium ion battery, and an electrochemical device other than batteries such as capacitors (condensers).

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention.

The present application is based on and claims the benefit of priority from Japanese Patent Application No. 2015-229834 filed on Nov. 25, 2015, the disclosure of which is incorporated herein in its entirety by reference.

REFERENCE SIGNS LIST

1 film-packaged secondary battery (electrochemical device)
2 positive electrode (positive electrode sheet)
3 negative electrode (negative electrode sheet)
4 separator
5 electrolyte solution
6 flexible film (laminate film)
7 positive electrode terminal (electrode terminal)
7*a*, 13*a* rounded corner portions
8 negative electrode terminal (electrode terminal)
9 current collector for positive electrode (positive electrode current collector)
10 active material layer for positive electrode (positive electrode active material layer)
11 current collector for negative electrode (negative electrode current collector)
12 active material layer for negative electrode (negative electrode active material layer)
13 metal piece (support tab)
14 outer container
15 welding horn
16 joining portion
17 storage element (electrode laminate)
18 sealing material (sealant)
19 anvil

The invention claimed is:

1. An electrochemical device comprising:
a storage element in which two different electrodes are superposed on each other with a separator interposed therebetween; and
an outer container made of a flexible film that houses the storage element and an electrolyte solution,
wherein the two different electrodes each include an active material-applied portion where an active material layer is formed on a current collector, and an active material-non-applied portion where no active material layer is formed on the current collector, each of the two different electrodes is provided with an electrode terminal and a support tab, one end portion of the electrode terminal being superposed on the active material-non-applied portion of the electrode in the outer container, the other end portion of the electrode terminal extending to an outside of the outer container, the support tab and the one end portion of the electrode terminal sandwiching the active material-non-applied portion in the outer container, and the active material-non-applied portion, the electrode terminal, and the support tab being joined at a position where they are superposed on one another, and the support tab has a planar shape without any corner portions of 90 degrees or less.

2. The electrochemical device according to claim 1, wherein
the support tab has a planar shape without any portion in which two linear sides cross at one point.

3. The electrochemical device according to claim 1, wherein
a plurality of active material-non-applied portions of the electrodes are superposed on one another to form an assembly, and the assembly, the electrode terminal, and the support tab are joined at a position where they are superposed on one another in a state where the assembly is sandwiched between the one end portion of the electrode terminal and the support tab.

4. The electrochemical device according to claim 1, wherein
the support tab has a planar shape having four rounded corner portions of a quadrangle.

5. The electrochemical device according to claim 4, wherein
a curvature radius of the rounded corner portion is 1.0 to 2.0 mm.

6. The electrochemical device according to claim 1, wherein
the support tab has a planar shape in which end portions of two parallel straight lines are connected with each other through a circular arc.

7. The electrochemical device according to claim 1, wherein
the support tab has an elliptical planar shape.

8. The electrochemical device according to claim 1, wherein
the electrochemical device is a secondary battery.

9. The electrochemical device according to claim 2, wherein
a plurality of active material-non-applied portions of the electrodes are superposed on one another to form an assembly, and the assembly, the electrode terminal, and the support tab are joined at a position where they are superposed on one another in a state where the assembly is sandwiched between the one end portion of the electrode terminal and the support tab.

10. The electrochemical device according to claim 2, wherein
the support tab has a planar shape having four rounded corner portions of a quadrangle.

11. The electrochemical device according to claim 10, wherein
a curvature radius of the rounded corner portion is 1.0 to 2.0 mm.

12. The electrochemical device according to claim 2, wherein
the support tab has a planar shape in which end portions of two parallel straight lines are connected with each other through a circular arc.

13. The electrochemical device according to claim 2, wherein
the support tab has an elliptical planar shape.

14. The electrochemical device according to claim 2, wherein
the electrochemical device is a secondary battery.

15. The electrochemical device according to claim 3, wherein
the support tab has a planar shape having four rounded corner portions of a quadrangle.

16. The electrochemical device according to claim 15, wherein
a curvature radius of the rounded corner portion is 1.0 to 2.0 mm.

17. The electrochemical device according to claim 3, wherein
the support tab has a planar shape in which end portions of two parallel straight lines are connected with each other through a circular arc.

18. The electrochemical device according to claim 3, wherein
the support tab has an elliptical planar shape.

19. The electrochemical device according to claim 3, wherein
the electrochemical device is a secondary battery.

* * * * *